United States Patent
Zeng et al.

(10) Patent No.: US 11,021,370 B2
(45) Date of Patent: Jun. 1, 2021

(54) LOW COST AND FAST METHOD TO MASSIVELY PRODUCE GRAPHENE AND GRAPHENE OXIDE WITH CARBON-RICH NATURAL MATERIALS AND THE USE OF THE SAME

(71) Applicants: Tingying Zeng, Woburn, MA (US); Kevin Zeng Qi, Woburn, MA (US)

(72) Inventors: Tingying Zeng, Woburn, MA (US); Kevin Zeng Qi, Woburn, MA (US)

(*) Notice: Subject to any disclaimer, the term of this patent is extended or adjusted under 35 U.S.C. 154(b) by 169 days.

(21) Appl. No.: 16/158,855

(22) Filed: Oct. 12, 2018

(65) Prior Publication Data
US 2019/0039907 A1    Feb. 7, 2019

Related U.S. Application Data (63) Continuation of application No. PCT/US2017/027445, filed on Apr. 13, 2017.
(Continued)

(51) Int. Cl.
*C01B 32/198* (2017.01)
*C01B 32/184* (2017.01)
(Continued)

(52) U.S. Cl.
CPC .......... *C01B 32/198* (2017.08); *B01J 19/126* (2013.01); *C01B 32/184* (2017.08); *C01B 32/19* (2017.08);
(Continued)

(58) Field of Classification Search
CPC ..... C01B 32/198; C01B 32/19; C01B 32/184; C01B 32/182; C01B 2204/00;
(Continued)

(56) References Cited

U.S. PATENT DOCUMENTS

| | | |
|---|---|---|
| 3,652,221 A | 3/1972 | Sloka |
| 5,495,979 A | 3/1996 | Sastri |

(Continued)

FOREIGN PATENT DOCUMENTS

| | | |
|---|---|---|
| CN | 102464315 | 5/2012 |
| CN | 102588684 | 7/2012 |

(Continued)

OTHER PUBLICATIONS

Machine Translation of CN 103771403A (Year: 2014).*
(Continued)

*Primary Examiner* — Daniel C. McCracken
(74) *Attorney, Agent, or Firm* — Lambert Shortell & Connaughton; David J. Connaughton, Jr.; Justin P. Tinger (57) ABSTRACT

This invention provides an innovative method to manufacture graphene layers or quantities and graphene oxide layers or quantities from graphite, coal slags, asphalt, and other carbon-rich sold materials in nature. The present invention uses controllable microwave irradiation to heat the mixtures of basic material, graphite, or coal slags, or asphalt, or their combinations with ionic liquids and surfactant plus environmentally friendly oxidation agents. This invention can generate the said-products of graphene layers and graphene oxides in a short time period of one second to 300 seconds. The present invention does not involve any concentrated sulfuric acid, nitric acid, nor huge water quantities needed for the purification, unlike the prior art. The as-produced graphene-based materials can be used for preparing conductive films for touch screens, producing graphene carbon fibers and three-dimensional porous graphene nanomaterials, and preparing graphene-based other intelligent nanocomposites for super-light-weight machines and vehicles.

15 Claims, 6 Drawing Sheets

Related U.S. Application Data (60) Provisional application No. 62/322,084, filed on Apr. 13, 2016.

(51) Int. Cl.

| | | |
|---|---|---|
| *C01B 32/19* | (2017.01) | |
| *B01J 19/12* | (2006.01) | |
| *B82Y 40/00* | (2011.01) | |
| *C09C 1/46* | (2006.01) | |
| *B82Y 30/00* | (2011.01) | |

(52) U.S. Cl.
CPC .. *B01J 2219/089* (2013.01); *B01J 2219/1206* (2013.01); *B82Y 30/00* (2013.01); *B82Y 40/00* (2013.01); *C01P 2002/82* (2013.01); *C01P 2002/85* (2013.01); *C01P 2004/04* (2013.01); *C09C 1/46* (2013.01)

(58) Field of Classification Search
CPC ............ C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B01J 2219/1284; B01J 2219/1278; B01J 2219/00486; B01J 19/126; B01J 2219/089; B01J 2219/1206; C09C 1/46; B82Y 30/00; B82Y 40/00; C01P 2004/04; C01P 2002/82; C01P 2002/85; D01F 9/12
See application file for complete search history.

(56) References Cited

U.S. PATENT DOCUMENTS

| | | | |
|---|---|---|---|
| 5,705,269 | A | 1/1998 | Pimenov |
| 5,709,774 | A | 1/1998 | Naieni |
| 7,297,368 | B2 | 11/2007 | Williams |
| 8,808,597 | B2 | 8/2014 | Wat |
| 2001/0001687 | A1 | 5/2001 | Pokorzynski |
| 2011/0268647 | A1 | 11/2011 | Ivanovici |
| 2012/0251763 | A1 | 10/2012 | Yamamoto |
| 2013/0102084 | A1 | 4/2013 | Loh et al. |
| 2013/0272950 | A1 | 10/2013 | Yun |
| 2013/0330477 | A1 | 12/2013 | Blair |
| 2014/0004344 | A1 | 1/2014 | Kim |
| 2014/0265038 | A1 | 9/2014 | Masker |
| 2015/0037530 | A1 | 2/2015 | Zhamu |
| 2015/0099185 | A1 | 4/2015 | Joo |
| 2015/0111449 | A1* | 4/2015 | Cruz-Silva ......... B01D 39/2065 442/153 |
| 2016/0043384 | A1 | 2/2016 | Zhamu |
| 2016/0145772 | A1 | 5/2016 | Yoon |
| 2016/0177050 | A1 | 6/2016 | Park |
| 2016/0347617 | A1* | 12/2016 | Zhang .................. C01B 32/192 |
| 2017/0241049 | A1 | 8/2017 | Zeng |
| 2018/0362393 | A1 | 12/2018 | Bi |

FOREIGN PATENT DOCUMENTS

| | | | | |
|---|---|---|---|---|
| CN | 103771403 | * | 5/2014 | ............ C01B 31/04 |
| WO | 201509704 | | 1/2015 | |
| WO | 2015034180 | | 3/2015 | |
| WO | WO 2015/100682 | * | 9/2015 | ............ C01B 31/04 |

OTHER PUBLICATIONS

Sridhar, et al., Synthesis of graphene nano-sheets using eco-friendly chemicals and microwave radiation, Carbon 2010; 48: 2953-2957 (Year: 2010).*

Xu, Y et al. Flexible graphene films via the filtration of water-soluble noncovalent functionalized graphene sheets. Journal of the American Chemical Society. 2008. vol. 130. No. 18; pp. 5856-5857; p. 5856, figure 1.

Patent Cooperation Treaty International Search Report—PCT/US17/27445, dated Jul. 17, 2017.

(Haven, Paul et al.) Fact Sheet—Vehicle Efficiency and Emissions Standards. Environmental and Energy Study Institute. Aug. 26, 2015.

CN 102588684, machine translation, 2015. (Year: 2015).
WO2015097047, machine translation, 2015. (Year: 2015).
Non-Final Rejection of U.S. Appl. No. 15/441,972, dated Dec. 28, 2018.
Final Rejection of U.S. Appl. No. 15/441,972, dated Jul. 18, 2019.
Non-Final Rejection of U.S. Appl. No. 15/441,972, dated Jan. 29, 2020.
Non-Final Rejection of U.S. Appl. No. 16/158,814, dated Apr. 16, 2020.
(Cheng, H et al.) Graphene fiber: a new material platform for unique applications. NPG Asia Materials, vol. 6, Jul. 8, 2014; abstract; pp. 6-7.
(Li, Y et al.) Highly conductive microfiber of graphene oxide template carbonization of nanofibrillated cellulose. Advanced Functional Materials, vol. 24, No. 46, pp. 7366-7372. Dec. 1, 2014; abstract; pp. 7367-7368, 7371.

* cited by examiner

Figure 3A EDAX analysis of graphene layers obtained from Microwave Processing

Figure 3B EDAX analysis of graphene layers obtained from Microwave Processing

Figure 4A: the Raman spectroscopy characterization of graphene oxide produced directly from the microwave processing.

Figure 4B

LOW COST AND FAST METHOD TO MASSIVELY PRODUCE GRAPHENE AND GRAPHENE OXIDE WITH CARBON-RICH NATURAL MATERIALS AND THE USE OF THE SAME

FIELD OF THE INVENTION

The present invention is mostly related to an innovative technology to produce massive graphene layers and graphene oxide layers from previous reported methods for different applications. It also provides a new exciting application of carbon rich solid waste such as coal slags and asphalt for advanced graphene nanomaterials for society.

BACKGROUND

In the entire graphene field, the traditional and famous Hummer's method has been so widely used to synthesize graphene layers and graphene oxides in laboratories and many industrial companies for commercialization. However, it has caused reactor explosions due to large amount of heat and gases released, because the use of strong acids such as nitric acid, sulfuric acid, and strong oxidation agents such as $KMnO_4$, $P_2O_5$, $K_2S_2O_8$ and so on. Purification of the products normally need to use centrifuge and have to use large amounts of water to wash away the strong acids from the graphene products. Thus, strong acids are waste products in this process. In addition, the reaction time needs over at least one day. It is an extensive time consuming and energy-high demanded method that we have to overcome. A number of other methods have been reported to try to substitute the Hummer Method from different research groups, such as electrochemical exfoliation, potassium ferrate replacing $KMnO_4$ for one step oxidation in sulfuric acid, and microwave-irradiation assistant in ionic liquids. They either still suffer time consuming and waste-acid producing problem, centrifuge purification facility high cost, or expensive raw materials of ionic liquid materials bottleneck problems for commercialization.

To overcome the significant pollution, high energy-demand, and time-consumption problems that are factors in the conventional graphene production methods, our present invention provides an innovative technology in using carbon rich solid materials from nature combined with certain low cost additives and microwave irradiation to quickly and green-chemically produce massive graphene layers and graphene oxides for different applications without involving strong acids, without need centrifuge technology, and without large quantities of water. Processing time is in the seconds to minutes range, which can dramatically decrease the manufacturing cost.

SUMMARY OF THE INVENTION

The present invention uses graphite, coal slags, asphalt, and other carbon-rich sold materials in nature. It generally uses controllable microwave irradiation to heat the mixtures of a base ("basic material"), graphite, or coal slags, or asphalt, or their combinations with ionic liquids and surfactant plus environmentally friendly oxidation agents. This invention can generate the said-products of graphene layers and graphene oxides from a short time range of, for example, approximately 1 second to 60 min. It does not involve any concentrated sulfuric acid, nitric acid, nor are huge quantities of water needed for the purification. The as-produced graphene-based materials can be used, by way of non-limiting example, for continuously preparing conductive films for touch screens, cost-effectively producing graphene carbon fibers and three-dimensional porous graphene nanomaterials, and preparing graphene-based intelligent nanocomposites for super-light-weight machines and vehicles. There are many more potential applications that may be explored gradually by this invention.

The present invention represents an opportunity to provide low cost, energy savings, greener chemical process manufacturing for advanced graphene and its based-nanomaterials, as well as for graphene oxide and its based nanomateirals for different applications. It works by one step to form high quality graphene layers and graphene oxide layers and their combinations.

The purpose of the invention is to provide a method to manufacture graphene and graphene oxide layers from one to a few layers range manufacturing process.

Another purpose of the invention is to provide large amounts of waste usage method for coal slags and asphalt.

A further purpose of the invention is to allow for the industry manufacturing of graphene and graphene oxides in one step using microwave reactors only, which does not have as much waste and pollution released to the environment as current methods do.

Another purpose of the invention is to significantly decrease the required manufacturing time to produce the designed products.

A further purpose of the invention is to decrease the requirements of equipment for the manufacture of massive graphene and graphene oxide from all kind of graphite including normal graphite and expandable graphite, and even impurities-contained graphite, impurities-contained coal slags, or impurities-contained-asphalt. Thus the carbon rich solid raw materials can be broadened significantly. It is not necessary to have 99.0% purity of the graphite and the coals or asphalt.

Another purpose of the invention is to produce graphene layers and graphene oxide layers that may be functionalized directly during the microwave irradiated reactions with the addition of other elements such and/or compositions which can be used to create products which have a broad range of unique and enhanced functional properties, such as nitrogen doping, thermo-conductivity and electrical conductivity management and adjusting, resistance to corrosion, and many other properties that will be able to be used to improve electronics, energy efficiency, solar water splitting for hydrogen fuel, better battery electrode materials design, and formation of molecules similar to polyacrylonitrile (PAN) for high quality graphene-based carbon fiber production etc.

A further purpose of the invention is to reduce the environmental impact and reliance on energy-saving and green chemical manufacturing.

BRIEF DESCRIPTION OF THE DRAWING

The utility method shall be hereby described in detail in the description with reference to the attached drawing, in which.

DETAILED DESCRIPTION OF THE INVENTION

The aforementioned goals are achieved by the present invention using microwave reactor such as a magnetron-based microwave devices to provide controllable irradiation to substance mixture that is formed uniformly by carbon rich solid raw materials such as graphite, coal slags, asphalt, a basic material, surfactants, and small amount of ionic liquid solvent, as well as small amounts of optional additives. The microwave may be capable of providing microwave energy having an intensity of about 150 to about 3000 W. The microwave irradiation time is in seconds and minutes from 1 second to 60 min varied with different type of carbon rich solid materials. Pretreatment to ensure the mixture to be uniform in some cases is needed, such as grinding-milling graphite with a basic material, and surfactants, and ionic liquid. Posttreatment to the as-prepared graphene layers or graphene oxide layers will be performed easily by adding the primary products into water and use ultra-sonication to disperse the mixture to uniform suspension, then flowing selection to the graphene layers or graphene oxide layers will be carried out by flowing out the suspension in different vertical height levels.

Examples of carbon rich solid raw materials include, but are not limited to graphite, acid-treated expandable graphite from different suppliers, all kinds of coal slags such as brown coal slags, and asphalt from re-fining oil plants.

Examples of basic materials include, but are not limited to sodium hydroxide, potassium hydroxide, baking soda, sodium bicarbonate, urea, ammonium hydroxide, and all salts that can be dissolved in water while maintaining pH value higher than 6.

Examples of surfactants include, but are not limited to all cations and ionic surfactants, such as quaternary ammonium salts, cetrimonium bromide, polyatomic cations such as poly(diallyldimethylammonium chloride) (PDDA), organic ammonium cation, iminium salt, polystyrene sulfonates etc.

Examples of ionic liquid solvents include, but are not limited to ionic liquids, such as all salts of imidazolium, pyridinium salts, 1-butyl-3-methylimidazolium (BMIM)-based and 1-ethyl-3-methylimidazolium (EMIM)-based ionic liquid, such as 1-ethyl-3-methylimidazolium tetrafluoroborate, 1-butyl-3-methylimidazolium hexafluorophosphate, but preferring acetate salts for environmental consideration. In some cases, water, alcohols, acetone, ketones, dimethyl formamide (DMF), ethylene glycol (EG), DMSO, and their co-solvents, but generally prefer ionic liquids, water, and alcohols for the green chemical manufacturing.

Examples of additional additives include, but are not limited to azodicarbonamide, small molecules amines, ammonium hydroxide, urea, metal oxides (MgO, ZnO, $Fe_3O_4$, $Co_2O_3$, NiO, $ZrO_2$, or $MoS_2$, $WS_2$, $Al_2O_3$, or their combination), and metal nanoparticles (Ni, Fe, Co, Mg, Al, steel alloy nanopowder, Pd, or their combinations) may be used to ensure a specially functionalization to graphene and graphene oxide during the reactions. Also, additional additives may be oxidation reagents for some case reactions to realize graphene oxide layers obtained. The additives can be, but are not limited to, $KMnO_4$, potassium ferrate, sodium ferrate, peroxide. For safety and environmental consideration, preferring potassium ferrate, sodium ferrate, hydrogen peroxide as need for some case reactions.

The as-prepared graphene layers in slurries may be directly conducted with additives to massively manufacture graphene-based carbon fibers, or to prepare graphene-based nanocomposite functional films, or to synthesize three dimensional porous graphene based nanocomposites for different applications, or to conduct 3D additive printing manufacturing for parts or articles for automobiles and machines including robotics and airplanes and ships, among other applications.

In summary, our invention leads to large a number of graphene layers and graphene oxide layers produced in microwave reactor in a few minutes and in a one step reaction without using any strong acid and without large amounts of water. The as-prepared products have excellent mechanical properties such as strength, and adjustable properties for thermal and electrical conductivities, shielding radiations, and electromagnetic waves, anti-corrosion, and more.

Figure 1:
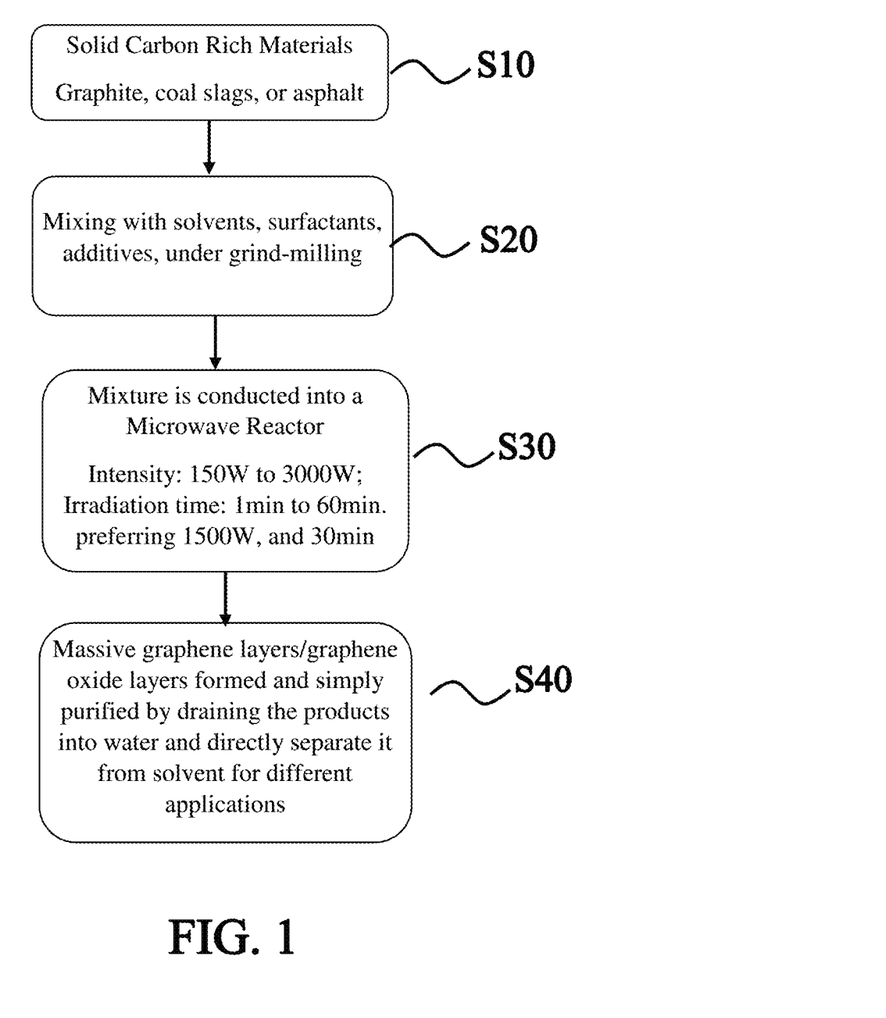
FIG. 1 is a flowchart showing a method of manufacturing graphene and graphene oxide through microwave irradiations using carbon rich solid materials such as graphite, coal slags, and asphalt etc.

Referring to FIG. 1, showing the operational flowchart of the method of manufacturing graphene and graphene oxides according to the present invention. As shown in FIG. 1, the method of the present invention generally comprises the steps of obtaining graphite, coal slags, or asphalt S10, mixing with the said solvent(s), surfactant(s), additive(s) that includes oxidation reagents under grinding-milling S20, and conducting the mixed suspension into a properly designed Microwave Reactor applying an irradiation with intensity between 150W to 3000W, and S30 time between 1 second to 60 minutes, preferring 500W and less than 10 minutes for pre-treated graphites and asphalt, but 500-1500W and within 30 min for coal slags. Mixing may be achieved by an ultrasonic mixer, grind milling, and any other process. By altering the irradiation treatment applied, the qualities of the resulting graphene and graphene oxide can be manipulated and enhanced; finally graphene and graphene oxide slurry is prepared by simply separating the as-prepared graphene/graphene oxide layers with solvents S40.

Figure 2:
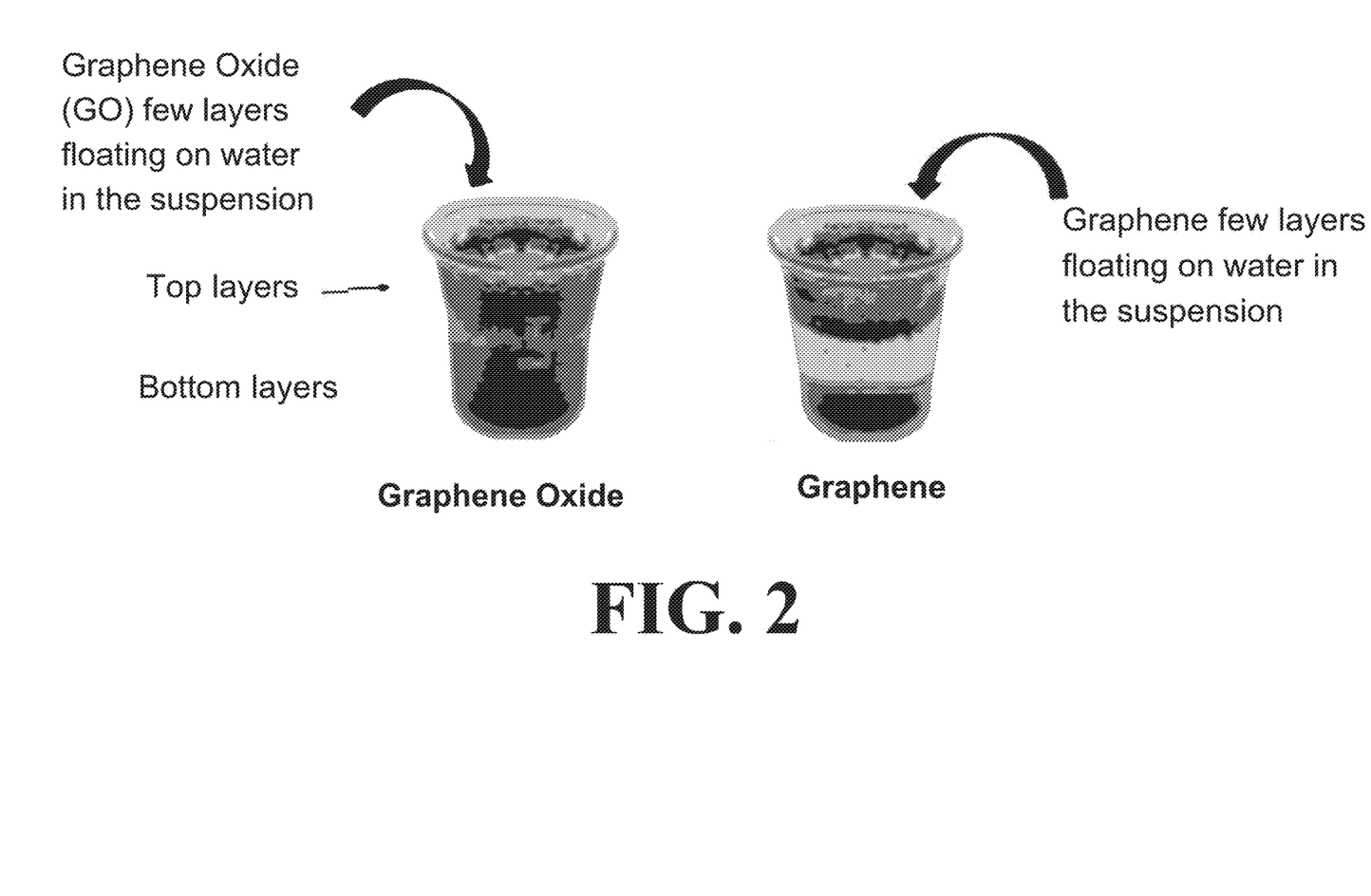
FIG. 2 provides a photograph of an embodiment of the present invention.
Figure 3A:
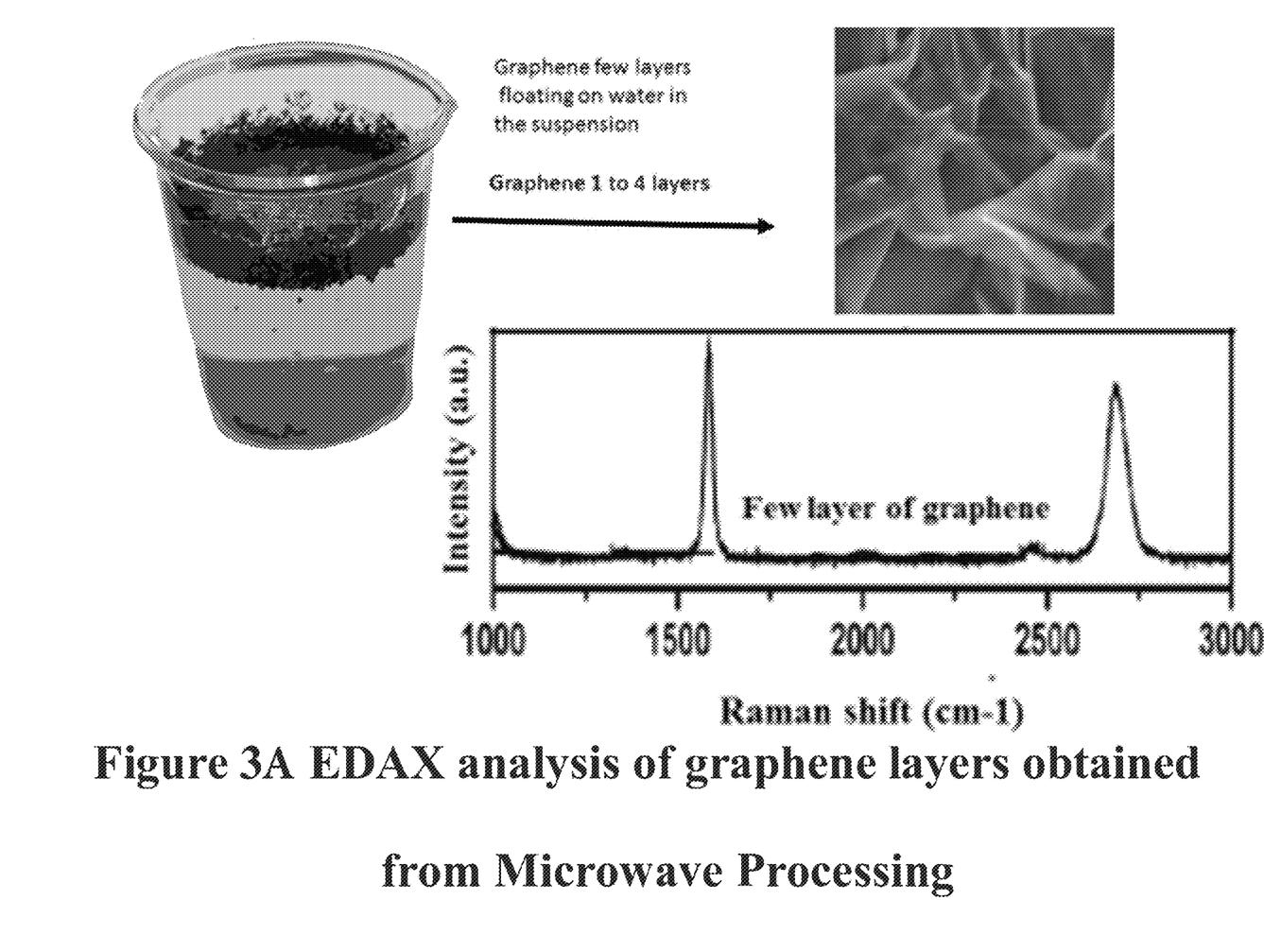
FIG. 3A shows an EDAX analysis of graphene layers obtained from Microwave Processing.
Figure 3B:
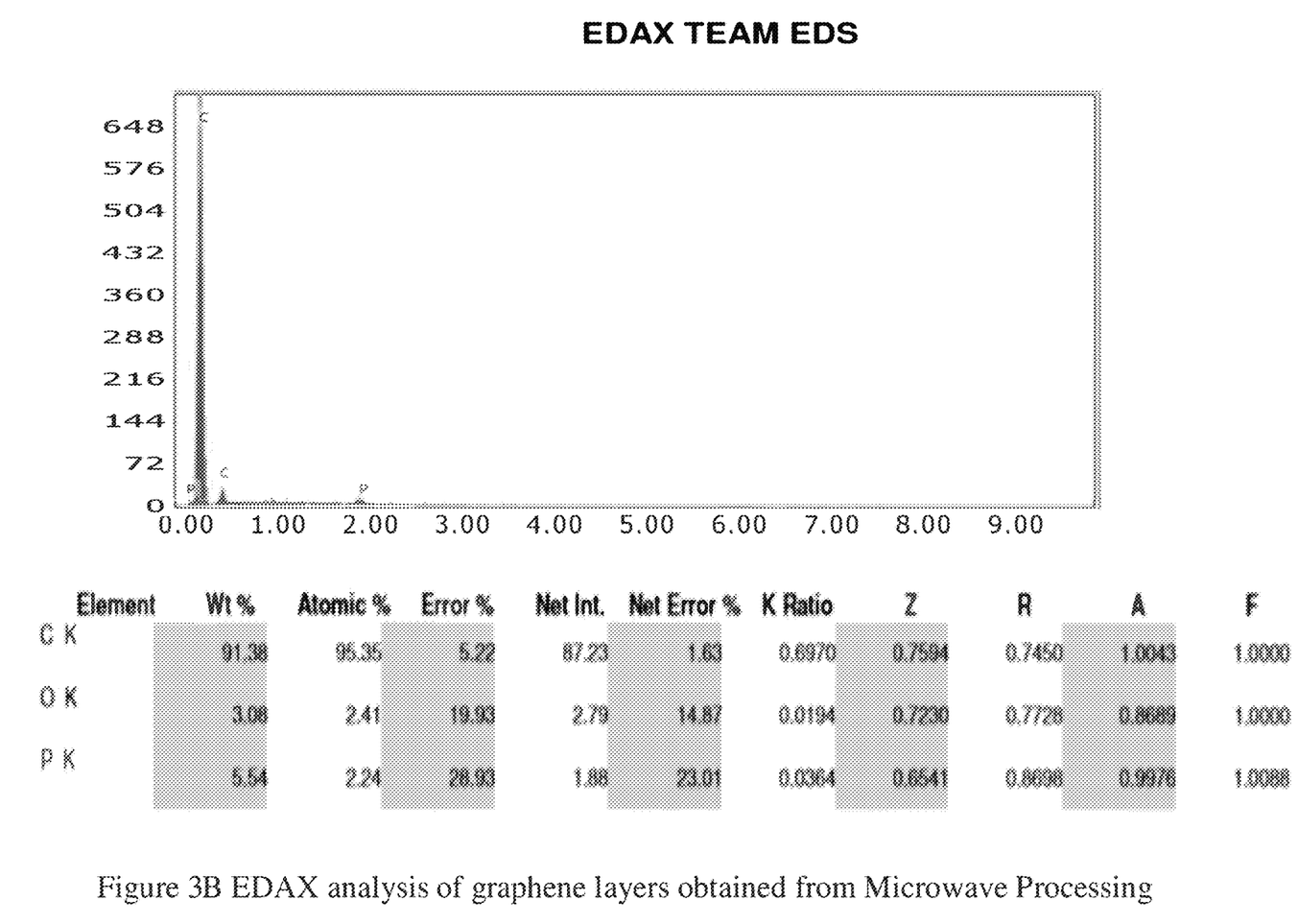
FIG. 3B shows an EDAX analysis of graphene layers obtained from Microwave Processing.

Examples of this Invention are Given as Follows:

FIGS. 2 and 3 gives the photo of this invention that shows the microwave irradiation and the dispersed graphene or graphene oxide suspensions for floating selection for different applications. FIG. 2 shows microwave irradiation and the dispersed graphene or graphene oxide suspensions for floating selection for different applications.

To obtain graphene oxide layers, oxidation agents and corresponding additives are different from graphene layer exfoliation. Pretreatment is necessary before microwave irradiation.

1) Graphene Few Layers Product:

Normal graphite can be used as graphene source. In FIG. 1, during the grind-milling process, additives added into graphite are mostly ionic compound(s) plus surfactant and iron or cobalt or nickel salt. Microwave irradiation for graphene productions should be for a shorter time than for generation of graphene oxide. For instance, irradiation time is preferred in the range of 1 second to 3 min. To avoid an accident from overheating or sparking for a safe process, aluminum hydroxide, magnesium hydroxide, or phosphoric acid or phosphorus salts can be added with a concentration 0.01% to 20% to the mixture, preferably around ~10%. A suspension is obtained after directly dispersing the microwave irradiated mixture. Graphene layers are floating on the water. The floating graphene can be directly separated by filtration and used for conductive films, radiation absorption films, or graphene powder preparation for graphene composites, for instance to prepare polymer-graphene compounds for nanofibers. In FIG. 2 on the right is the photo of the invention floating selection for graphene few layers product. This product shows high conductivity and easily disperse in DMF or other organic solvents for conductive products manufacturing.

2) For graphene oxide few layer products

Expandable graphite in the market can be used as graphene oxide source. In FIG. 1, during the grind-milling process, additives added into graphite are mostly ionic compound(s) plus surfactant and oxidation agent with iron or cobalt or nickel salt. Microwave irradiation should be for a longer time than the generation of graphene layers. For instance, the microwave irradiation time is preferably in the range of 1 min to 30 min. To avoid accident from overheating or sparking for a safe process, aluminum hydroxide, magnesium hydroxide, or phosphoric acid or phosphorus salts can be added with a concentration 0.01% to 20% the mixture, with preferably around ~10%. A suspension is obtained after directly dispersing the microwave irradiated mixture in water. Graphene oxide layers are floating on the water, which can be directly separated by filtration and used for graphene-based carbon fiber manufacturing, or 3D printed graphene machine articles. The lower level graphene oxide in the suspension at the bottom of the container, having higher oxygen to carbon ratio than that of the upper suspension, can be used for porous graphene oxide foam and radiation absorption films, or graphene powder preparation. FIG. 2 on the left is the photo of the invention floating selection for graphene oxide layers' products. This product shows some conductivity and easily disperses in polar organic solvents (methanol, alcohol, isopropyl alcohol, DMF, and water etc. It can be directly used for graphene carbon fiber manufacturing, and produce multifunctional graphene nanomaterials for energy-related applications.

Figure 4A:
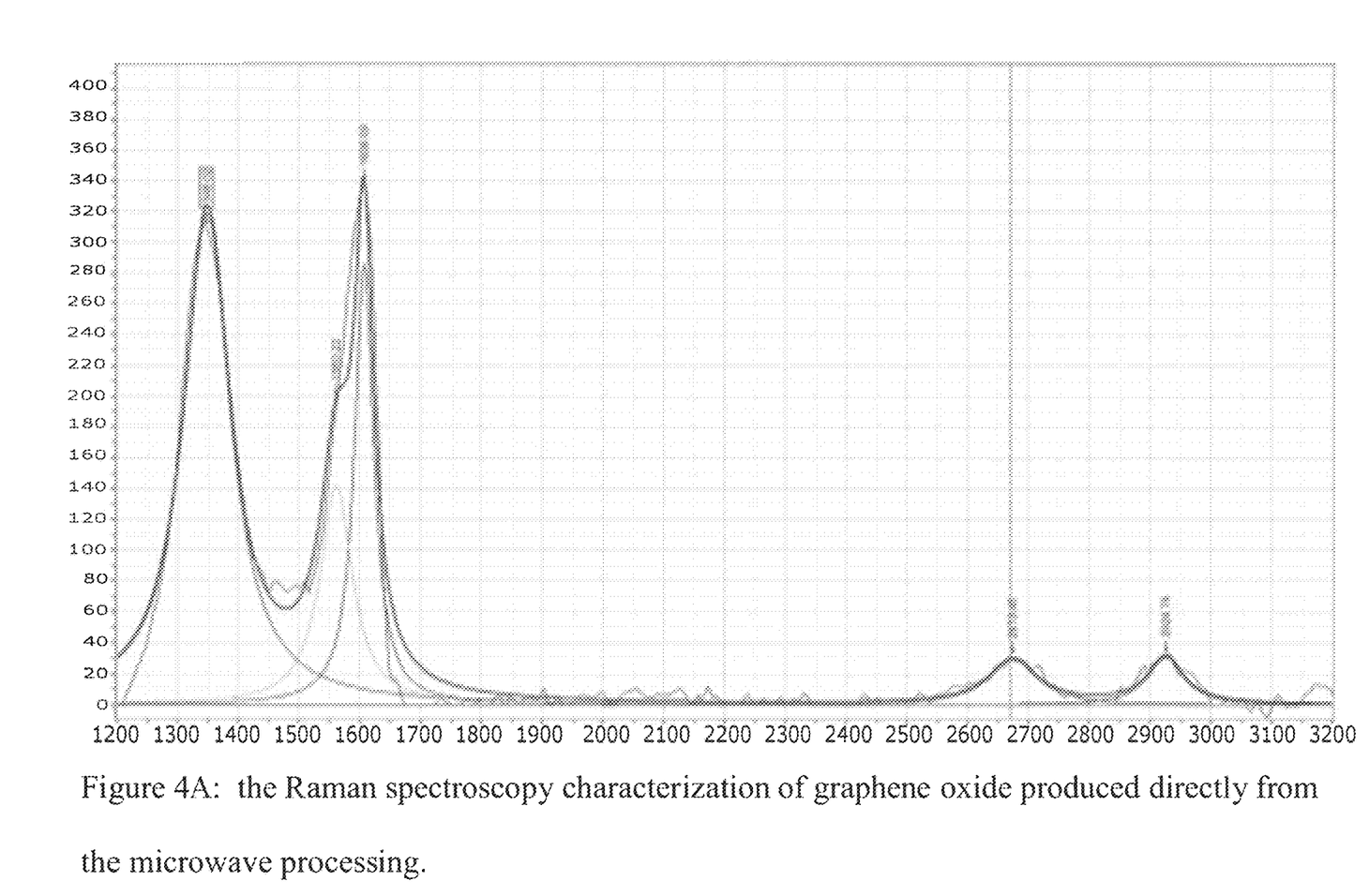
FIG. 4A shows a Raman spectroscopy characterization of graphene oxide produced directly from the microwave processing.

FIG. 3A shows the graphene product obtained from this invention using graphite as the natural raw materials, which consists of 1 to 4 layers in the suspension, and FIG. 3B shows its high pure quality over 95% carbon in wt as indicated in EDAX analysis. Raman spectroscopy confirms the high quality of graphene layers. FIG. 4A is the Raman spectroscopy characterization of graphene oxide produced directly from the microwave processing.

Figure 4B:
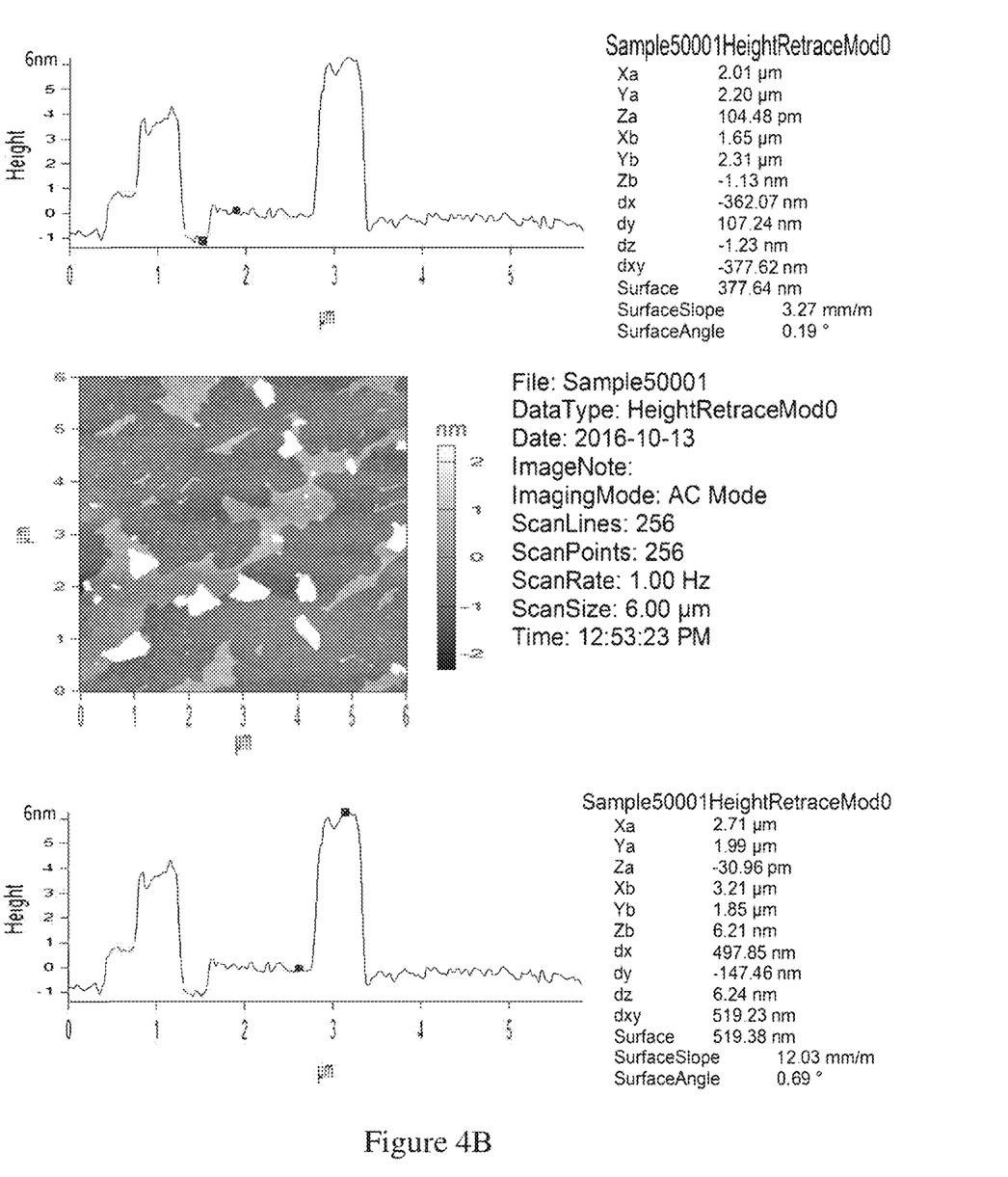
FIG. 4B shows the characterization of atomic force microscope image and it shows the graphene oxide flakes consisting of 2 to 5 layers directly obtained in this invention.

FIG. 4B is the characterization of atomic force microscope image and it shows the graphene oxide flakes consisting of 2 to 5 layers directly obtained in this invention, indicating a high quality manufacturing for a massive graphene oxide product.

The grind-milling agents for coal slags or petroleum asphalt will be basic, such as sodium hydroxide, calcium hydroxide and ionic compound plus some salt in this invention. To produce graphene based on the coal or petroleum asphalt would be similar to the graphite processing, with the difference of the irradiation time and microwave power as indicated in previous description.

Additionally, for coal slags and petroleum asphalt carbon rich nature materials, the grind-milling agents are basic, such as sodium hydroxide, calcium hydroxide and ionic compound plus some salt in this invention. To produce graphene few layers based on the coal or petroleum asphalt would be similar to the graphite processing, with the difference of the irradiation time and microwave power as indicated in previous description.

What is claimed is:

1. A method for producing at least one of graphene and graphene oxide comprising the steps of:
   obtaining a quantity of carbon rich material in a solid state;
   mixing the carbon rich material with a solvent, a surfactant, and an additive, forming a mixture;
   conducting the mixture into a microwave reactor, the microwave reactor configured to provide microwave radiation to the mixture;
   directing a sufficient quantity of microwave radiation to the mixture in the microwave reactor to form at least one of a quantity of graphene and a quantity of graphene oxide; and
   separating the at least one of the formed quantity of graphene and quantity of graphene oxide from the solvent.

2. The method of claim 1 wherein the directing step comprises directing microwave radiation having an intensity of 150W to 3000W.

3. The method of claim 1 wherein the step of directing the microwave radiation to the mixture is performed for a time period of between approximately 1 second and approximately 60 minutes.

4. The method of claim 1 wherein the carbon rich material is at least one of graphite, acid-treated expandable graphite, coal slags, brown coal slags, and asphalt.

5. The method of claim 1 further comprising the step of adding a basic material before or after the mixing step, wherein the basic material is at least one of sodium hydroxide, potassium hydroxide, baking soda, sodium bicarbonate, urea, ammonium hydroxide, and salts that can be dissolved in water while maintaining pH value higher than 6.

6. The method of claim 1 wherein the surfactant is at least one of quaternary ammonium salts, cetrimonium bromide, polyatomic cations such as poly(diallyldimethylammonium chloride) (PDDA), organic ammonium cation, iminium salt, and polystyrene sulfonates.

7. The method of claim 1 wherein the solvent is at least one of salts of imidazolium, pyridinium salts, 1-butyl-3-methylimidazolium (BMIM)-based and 1-ethyl-3-methylimidazolium (EMIM)-based ionic liquid, such asl-ethyl-3-methylimidazolium tetrafluoroborate, 1-butyl-3-methylimidazolium hexafluorophosphate, water, an alcohol, acetone, a ketone, dimethyl formamide (DMF), ethylene glycol (EG), DMSO, and their co-solvents.

8. The method of claim 1 wherein the additive is at least one of azodicarbonamide, a small molecules amine, ammonium hydroxide, urea, metal oxides, metal nanoparticles, KMnO4, potassium ferrate, sodium ferrate, and peroxide.

9. The method of claim 1 wherein the step of mixing comprises grind-milling.

10. The method of claim 1 wherein the step of mixing comprises mixing with an ultrasonic mixer, the mixing with the ultrasonic mixer creating a mixture having a substantially uniform suspension.

11. The method of claim 1 further comprising the step of grinding the carbon rich material before the mixing step.

12. The method of claim 1 further comprising the step of forming carbon fibers from the separated graphene and graphene oxide.

13. The method of claim 1 wherein the directing step comprises directing microwave radiation having an intensity of approximately 1500W.

14. The method of claim 1 wherein the step of directing the microwave radiation to the mixture is performed for a time period of approximately 30 minutes.

15. The method of claim 1 wherein the step of separating the formed graphene and graphene oxide from the solvent comprises draining the components from the microwave reactor into a quantity of water, the water allowing the formed graphene and graphene oxide to separate from the solvent.

* * * * *